UNITED STATES PATENT OFFICE.

GEORGE L. EAGAN, OF SAN FRANCISCO, CALIFORNIA, ASSIGNOR OF ONE-HALF TO RICHARD F. KNOX, OF SAME PLACE; JAMES C. PENNIE ADMINISTRATOR OF GEORGE L. EAGAN, DECEASED.

HYDRAULIC-CEMENT COMPOUND.

SPECIFICATION forming part of Letters Patent No. 387,199, dated July 31, 1888.

Application filed September 1, 1887. Serial No. 248,548. (No specimens.)

*To all whom it may concern:*

Be it known that I, GEORGE L. EAGAN, a citizen of the United States, residing in the city and county of San Francisco and State of California, have invented a certain new and useful Composition of Matter to be used as Hydraulic Cement, of which the following is a specification.

My composition consists of the following ingredients, combined in the proportions stated: lime-rock, sixty-five per cent.; silex, fifteen per cent.; mineral magnesite, ten per cent.; alumina, ten per cent. The substance which is here designated as "lime rock" is a rock containing carbonate of lime, magnesia, sesquioxide of iron, and alumina. By mineral magnesite is meant a mineral composed of magnesia, carbonic acid, silica, and usually some ferro-oxide. These natural or raw products are crushed and ground dry, and the powder thus formed run into a mixer and thoroughly incorporated together, when a small proportion of water is added. The moistened powder is then formed into eggs or bricks and then placed in an ordinary drying-kiln and burned at a high-degree heat, and when this has been accomplished the calcined product is ground to a powder and ready for use. By this construction of natural products when properly mixed and calcined a cement is formed of greater hydraulic energy than the Portland cement of commerce, the magnesite forming an important factor in the composition, rendering the cement harder when set and of greater tenacity. A very good cement can be made, however, equal in strength to the Portland cement by leaving out the silex and adding its equivalent in weight to each of the other products—that is to say, five per cent. increase to the lime-rock and five per cent. increase to the magnesite and clay or alumina, or the clay and alumina may be omitted altogether and its equivalent in weight be added to the lime-rock and silex by increasing the quantity of lime rock and silex five per cent. each to obtain the unit of one hundred parts.

Having thus described my invention, what I claim, and desire to secure by Letters Patent, is—

1. The herein-described cement, consisting in the combination of lime-rock, silex, mineral magnesite, and alumina, as specified.

2. The herein-described composition of matter to be used as a cement, consisting of lime-rock, silex, magnesite, alumina, and water, mixed and compounded in about the proportions specified and in the manner set forth.

In testimony that I claim the foregoing I have hereunto set my hand and seal.

GEORGE L. EAGAN. [L. S.]

Witnesses:
C. W. M. SMITH,
LEE D. CRAIG.